(12) United States Patent
Furman, Jr. et al.

(10) Patent No.: US 10,731,063 B2
(45) Date of Patent: Aug. 4, 2020

(54) USE OF BORONIC ACID-FUNCTIONALIZED POLYMERS AS YANKEE COATING ADHESIVES

(71) Applicant: Ecolab USA Inc., St. Paul, MN (US)

(72) Inventors: Gary Samuel Furman, Jr., St. Charles, IL (US); David J. Castro, DeKalb, IL (US); Christopher Kaley, Schaumburg, IL (US); Kevin McDonald, Oak Park, IL (US); Mingli Wei, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 15/983,571

(22) Filed: May 18, 2018

(65) Prior Publication Data

US 2018/0334601 A1 Nov. 22, 2018

Related U.S. Application Data

(60) Provisional application No. 62/508,645, filed on May 19, 2017.

(51) Int. Cl.
*C09J 179/02* (2006.01)
*D21F 5/18* (2006.01)
*C09J 11/08* (2006.01)
*D21H 21/14* (2006.01)

(52) U.S. Cl.
CPC .......... *C09J 179/02* (2013.01); *C09J 11/08* (2013.01); *D21F 5/181* (2013.01); *D21H 21/146* (2013.01)

(58) Field of Classification Search
CPC ........ D21F 5/181; D21F 5/146; C09J 179/02; C09J 11/08
USPC ........................................................ 523/435
See application file for complete search history.

(56) References Cited

U.S. PATENT DOCUMENTS

| | | | |
|---|---|---|---|
| 5,382,323 A | 1/1995 | Furman, Jr. et al. | |
| 6,277,242 B1 | 8/2001 | Archer et al. | |
| 7,048,826 B2 | 5/2006 | Archer et al. | |
| 7,943,713 B2 | 5/2011 | Pelton et al. | |
| 8,066,847 B2 | 11/2011 | Grigoriev et al. | |
| 8,071,667 B2 | 12/2011 | Furman, Jr. et al. | |
| 8,105,045 B2 | 1/2012 | Furman et al. | |
| 8,444,812 B2 | 5/2013 | Grigoriev et al. | |
| 8,753,478 B2 | 6/2014 | Grigoriev et al. | |
| 2005/0203256 A1 | 9/2005 | Destarac et al. | |
| 2007/0027266 A1 | 2/2007 | Zard et al. | |
| 2007/0151684 A1 | 7/2007 | Grigoriev et al. | |
| 2007/0208115 A1 | 9/2007 | Grigoriev et al. | |
| 2008/0099172 A1 | 5/2008 | Pelton et al. | |
| 2009/0042793 A1 | 2/2009 | Balzarini | |
| 2012/0004148 A1 | 1/2012 | Ogle et al. | |
| 2012/0043203 A1 | 2/2012 | Lin et al. | |
| 2014/0221256 A1 | 8/2014 | Holtsclaw et al. | |
| 2016/0090526 A1 | 3/2016 | Holtsclaw et al. | |

FOREIGN PATENT DOCUMENTS

| WO | WO 2006/010268 A1 | 2/2006 |
|---|---|---|
| WO | WO 2016/025002 A1 | 2/2016 |

OTHER PUBLICATIONS

Chen et al., "Polyvinylamine Boronate Adhesion to Cellulose Hydrogel," *Biomacromolecules*, vol. 7, pp. 701-702 (2006).
Wang et al., "Study of temperature/glucose dually responsive nanocapsules with interpenetrating polymer network structure," *ICAFPM 2011—Proceedings of 2011 International Conference on Advanced Fibers and Polymer Materials*, 1 pg. (Aug. 15, 2011-Aug. 17, 2011).
European Patent Office, International Search Report in International Patent Application No. PCT/US2018/033390, 4 pp. (Nov. 28, 2018).
European Patent Office, Written Opinion in International Patent Application No. PCT/US2018/033390, 4 pp. (Nov. 28, 2018).

*Primary Examiner* — David T Karst
(74) *Attorney, Agent, or Firm* — Eric D. Babych; Barnes & Thornburg LLP

(57) ABSTRACT

Methods and compositions useful in papermaking and tissuemaking applications are provided. Some embodiments of the methods and compositions comprise a polyaminoamide ("PAA") polymer functionalized with an acrylamidophenyl boronic acid and a crosslinked polyaminoamide functionalized with an acrylamidophenyl boronic acid. The methods and compositions provide useful properties for creping that include good adhesion even under excessively wet conditions, improved film uniformity, and good film durability, while maintaining good film softness and rewettability necessary for efficient runnability of the tissue machine.

20 Claims, No Drawings

USE OF BORONIC ACID-FUNCTIONALIZED POLYMERS AS YANKEE COATING ADHESIVES

This application is a nonprovisional application claiming the benefit of U.S. Provisional Patent Application Serial No. 62/508,645, filed May 19, 2017, the disclosure of which is incorporated herein by reference in its entirety.

TECHNICAL FIELD

The present application relates to polymer adhesives for coating a dryer in a papermaking process.

BACKGROUND OF THE INVENTION

Tissue paper is a lightweight paper that can be used to prepare absorbent products such as bath tissue, facial tissue, and absorbent towels. Tissue paper is generally prepared by forming a wet web of cellulosic fibers and transferring the web to a heated cylinder called a Yankee dryer to reduce the moisture content. The tissue paper is subjected to a creping process where the sheet is dried to a desired moisture level, and mechanically removed from the Yankee dryer by contacting a blade against the dryer.

At the interface between the Yankee dryer surface and the tissue web resides a thin film called a Yankee coating. The surface of the Yankee dryer is generally coated with a chemical additive such as a polymer. The chemical additive attaches the paper to the surface of the Yankee dryer, whereby the paper is creped by the creping blade. The chemical additive serves to protect both the surface of the Yankee dryer and the creping blade because, during the creping process, the blade contacts the polymer layer instead of scratching the metal surface of the Yankee dryer. Generally, the Yankee coating comprises chemical additives that are capable of facilitating efficient sheet transfer and desirable adhesion properties as well as provide protection for the surface of the Yankee dryer. Commonly used chemical additives include polyaminoamide-epichlorohydrin resins and polyvinyl alcohol.

The creping process directly affects the quality of the tissue paper product. Many of the properties of tissue are influenced by the creping process, including softness, bulk, stretch, and absorbency. There is a continuing need for improved Yankee coatings that enhance machine runnability, improve tissue product properties, and protect the dryer surface.

BRIEF SUMMARY OF THE INVENTION

A method of treating a creping cylinder is provided. The method comprises applying to the creping cylinder a creping adhesive composition comprising a boronic acid-functionalized polymer.

A creping adhesive composition is provided. The creping adhesive composition comprises a boronic acid-functionalized polymer. The boronic acid-functionalized polymer comprises a vinyl boronic acid monomer of formula (I)

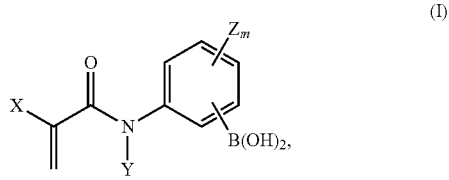

(I)

wherein X is hydrogen, $C_1$-$C_{12}$ alkyl, $C_2$-$C_{12}$ alkenyl, $C_2$-$C_{12}$ alkynyl, aryl, heteroaryl, halogen, or halosubstituted alkyl; Y is hydrogen, $C_1$-$C_{12}$ alkyl, $C_2$-$C_{12}$ alkenyl, $C_2$-$C_{12}$ alkynyl, aryl, heteroaryl, halogen, hydroxyl, alkoxy, carboxyl, or sulfonyl; each Z is the same or different, and is hydrogen, $C_1$-$C_{12}$ alkyl, $C_2$-$C_{12}$ alkenyl, $C_2$-$C_{12}$ alkynyl, aryl, heteroaryl, benzyl, alkylheteroaryl, halogen, halosubstituted alkyl, amino, aminoalkyl, cyano, alkoxy, hydroxyl, thiol, alkylthio, carbonyl, nitro, phosphoryl, phosphonyl, or sulfonyl; and m is 1, 2, 3, or 4; or a salt thereof.

Additionally, a method for preparing a creping adhesive comprising a boronic acid-functionalized polymer is provided. The boronic acid-functionalized polymer comprises a vinyl boronic acid monomer of formula (I).

A paper product produced using a boronic acid-functionalized polymer to treat a creping cylinder is provided, wherein the boronic acid-functionalized polymer comprises a vinyl boronic acid monomer of formula (I).

DETAILED DESCRIPTION OF THE INVENTION

The organization of the following definitions is for convenience only and is not intended to limit any of the definitions to any particular category.

"Alkyl" refers to a straight-chain or branched alkyl, for example, having 1, 2, 3, 4, 5, 6, 7, 8, 9, 10, 11, 12 carbons. Examples of such alkyl groups include methyl, ethyl, propyl, isopropyl, n-butyl, sec-butyl, isobutyl, tent-butyl, pentyl, isoamyl, hexyl, and the like. Alkyl groups may be unsubstituted or substituted by one or more suitable substituents.

"Alkenyl" refers to a straight or branched hydrocarbon, for example, having 2, 3, 4, 5, 6, 7, 8, 9, 10, 11, 12 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents.

"Alkynyl" refers to a straight or branched hydrocarbon, for example, having 2, 3, 4, 5, 6, 7, 8, 9, 10, 11, 12 carbons, and having one or more carbon-carbon triple bonds. Alkynyl groups include, but are not limited to, ethynyl, propynyl, and butynyl. Alkynyl groups may be unsubstituted or substituted by one or more suitable substituents.

"Alkoxy" refers to a moiety of the formula RO—, where R is alkyl.

"Alkylthio" refers to a moiety of the formula RS—. Alkylthio groups may be unsubstituted or substituted.

"Amino" refers to the moiety $H_2N$—.

"Aminoalkyl" refers to a nitrogen substituent attached to one or more carbon groups. For example, the aminoalkyl group can be RHN— (secondary) or $R_2N$— (tertiary) where R is alkyl or aryl. Aminoalkyl groups may be unsubstituted or substituted.

"Aryl" refers to an unsubstituted or substituted aromatic carbocyclic substituent, as commonly understood in the art, and the term "$C_6$-$C_{10}$ aryl" includes phenyl, naphthyl, and anthracyl, indanyl, and the like. It is understood that the term aryl applies to cyclic substituents that are planar and comprise 4n+2 electrons, according to Hückel's Rule. Aryl groups may be unsubstituted or substituted by one or more suitable substituents.

"Carbonyl" refers to a substituent comprising a carbon double bonded to an oxygen. Examples of such substituents include aldehyde, ketone, carboxylic acid, ester, amide, urea, and carbamate. Carbonyl groups may be unsubstituted or substituted by one or more suitable substituents.

"Halogen" or "halo" refers to a moiety selected from fluoride, chloride, bromide, and iodide.

"Halosubstituted alkyl" refers to an alkyl group as described above substituted with one or more halogens, for example, chloromethyl, trifluoromethyl, 2,2,2-trichloroethyl, and the like.

"Heteroaryl" refers to a monocyclic or bicyclic 5- or 6-membered ring system, wherein the heteroaryl group is unsaturated and satisfies Hückel's Rule. Non-limiting examples of suitable heteroaryl groups include furanyl; thiophenyl; pyrrolyl; pyrazolyl; imidazolyl; 1,2,3-triazolyl; 1,2,4-triazolyl; isoxazolyl; oxazolyl; isothiazolyl; thiazolyl; 1,3,4-oxadiazol-2-yl; 1,2,4-oxadiazol-2-yl; 5-methyl-1,3,4-oxadiazole; 3-methyl-1,2,4-oxadiazole; pyridinyl; pyrimidinyl; pyrazinyl; triazinyl; benzofuranyl; benzothiophenyl; indolyl; quinolinyl; isoquinolinyl; benzimidazolyl; benzoxazolinyl; benzothiazolinyl; quinazolinyl; and the like.

"Humectant" refers to a substance having affinity for water with stabilizing action on the water content of a material. For example, a humectant can be utilized to keep the moisture content caused by humidity fluctuations within a range.

"Hydroxyl" refers to a moiety of the formula HO—.

"Plasticizer" is an organic compound that, for example, can be added to a high molecular weight polymer to facilitate processing and/or increase flexibility and/or toughness of a creping adhesive composition.

"Tissue," "tissue paper," and "tissue product" may be used interchangeably and refer to lightweight paper or an article comprising lightweight paper made using a papermaking process. Non-limiting examples of tissue, tissue paper, and tissue product include toilet paper, paper towel, napkin, and facial tissue.

"Water soluble" means materials that are soluble in water to at least about 5%, by weight, at 25° C.

The term "multifunctional amine" is utilized herein to describe an organic compound comprising at least two primary amine groups and one secondary amine group that, when reacted with a multifunctional carboxylic acid, is capable of forming a polyaminoamide condensation polymer. Non-limiting examples of multifunctional amines include, but are not limited to, diethylenetriamine ("DETA"), triethylenetetramine ("TETA"), tetraethylenepentamine ("TEPA"), dipropylenetriamine ("DPTA"), and the like.

The term "multifunctional carboxylic acid" is utilized herein to describe an organic compound comprising at least two carboxylic acid groups that, when reacted with a multifunctional amine, is capable of forming a polyaminoamide condensation polymer. Non-limiting examples of multifunctional carboxylic acids include, but are not limited to, maleic acid, succinic acid, glutaric acid, adipic acid, pimelic acid, suberic acid, azelaic acid, sebasic acid, phthalic acid, isophthalic acid, terephthalic acid, and naphthalenedicarboxylic acid. The multifunctional carboxylic acids may also be derived from certain other compositions including, but not limited to, dimethyl maleate, dimethyl malonate, diethyl malonate, dimethyl succinate, di-isopropyl succinate, dimethyl glutarate, diethyl glutarate, dimethyl adipate, methyl ethyl adipate, dimethyl sebacate, dimethyl phthalate, dimethyl isophthalate, dimethyl terephthalate, dimethyl naphthalenedicarboxylate, dibasic esters ("DBE"), poly(ethylene glycol) bis(carboxymethyl) ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthalic anhydride, and the like.

Whenever a range of the number of atoms in a structure is indicated (e.g., a $C_1$-$C_{12}$ alkyl, $C_2$-$C_{12}$ alkenyl, $C_2$-$C_{12}$ alkynyl, etc.), it is specifically contemplated that any sub-range or individual number of carbon atoms falling within the indicated range also can be used. Thus, for example, the recitation of a range of 1-12 carbon atoms (e.g., $C_1$-$C_{12}$), 1-6 carbon atoms (e.g., $C_1$-$C_6$), 1-4 carbon atoms (e.g., $C_1$-$C_4$), 1-3 carbon atoms (e.g., $C_1$-$C_3$), or 2-12 carbon atoms (e.g., $C_2$-$C_{12}$) as used with respect to any chemical group (e.g., alkyl) referenced herein encompasses and specifically describes 1, 2, 3, 4, 5, 6, 7, 8, 9, 10, 11, and/or 12 carbon atoms, as appropriate, as well as any sub-range thereof (e.g., 1-2 carbon atoms, 1-3 carbon atoms, 1-4 carbon atoms, 1-5 carbon atoms, 1-6 carbon atoms, 1-7 carbon atoms, 1-8 carbon atoms, 1-9 carbon atoms, 1-10 carbon atoms, 1-11 carbon atoms, 1-12 carbon atoms, 2-3 carbon atoms, 2-4 carbon atoms, 2-5 carbon atoms, 2-6 carbon atoms, 2-7 carbon atoms, 2-8 carbon atoms, 2-9 carbon atoms, 2-10 carbon atoms, 2-11 carbon atoms, 2-12 carbon atoms, 3-4 carbon atoms, 3-5 carbon atoms, 3-6 carbon atoms, 3-7 carbon atoms, 3-8 carbon atoms, 3-9 carbon atoms, 3-10 carbon atoms, 3-11 carbon atoms, 3-12 carbon atoms, 4-5 carbon atoms, 4-6 carbon atoms, 4-7 carbon atoms, 4-8 carbon atoms, 4-9 carbon atoms, 4-10 carbon atoms, 4-11 carbon atoms, and/or 4-12 carbon atoms, etc., as appropriate).

Creping adhesive compositions and methods of treating a creping cylinder are provided. The creping adhesive compositions provided herein have been found to improve adhesion, film uniformity, and film durability, as well as impart desirable creping properties to paper when used to treat a creping cylinder. The present methods are useful for the manufacture of tissue products creped using a creping cylinder (e.g., a Yankee dryer).

A creping adhesive composition is provided. The creping adhesive composition comprises a boronic acid-functionalized polymer. In certain embodiments of the creping adhesive composition, the boronic acid-functionalized polymer comprises a vinyl boronic acid monomer of formula (I)

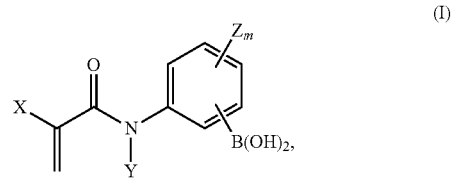

wherein X is hydrogen, $C_1$-$C_{12}$ alkyl, $C_2$-$C_{12}$ alkenyl, $C_2$-$C_{12}$ alkynyl, aryl, heteroaryl, halogen, or halosubstituted alkyl; Y is hydrogen, $C_1$-$C_{12}$ alkyl, $C_2$-$C_{12}$ alkenyl, $C_2$-$C_{12}$ alkynyl, aryl, heteroaryl, halogen, hydroxyl, alkoxy, carboxyl, or sulfonyl; each Z is the same or different, and is hydrogen, $C_1$-$C_{12}$ alkyl, $C_2$-$C_{12}$ alkenyl, $C_2$-$C_{12}$ alkynyl, aryl, heteroaryl, benzyl, alkylheteroaryl, halogen, halosubstituted alkyl, amino, aminoalkyl, cyano, alkoxy, hydroxyl, thiol, alkylthio, carbonyl, nitro, phosphoryl, phosphonyl, or sulfonyl; and m is 1, 2, 3, or 4; or a salt thereof.

In certain embodiments of the creping adhesive composition, the boronic acid-functionalized polymer is selected from a vinyl boronic acid-functionalized polyaminoamide, a vinyl boronic acid-functionalized crosslinked polyaminoamide polymer, or a combination thereof.

In certain embodiments of the creping adhesive composition, the vinyl boronic acid is

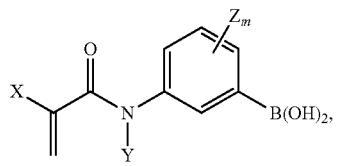

wherein X, Y, Z, and m are defined as described herein.

In certain embodiments of the creping adhesive composition, Y is hydrogen.

In certain embodiments of the creping adhesive composition, X is a $C_1$-$C_5$ alkyl group.

In certain embodiments of the creping adhesive composition, X is methyl.

In certain embodiments of the creping adhesive composition, X, Y, and Z are each hydrogen.

In certain embodiments of the creping adhesive composition, each Z is one or more electron-withdrawing groups.

In certain embodiments of the creping adhesive composition, each Z is one or more halogens.

In certain embodiments of the creping adhesive composition, the vinyl boronic acid monomer of formula (I) is an ammonium salt.

In certain embodiments of the creping adhesive composition, the boronic acid substituent is at the 3-position of the phenyl ring.

In certain embodiments of the creping adhesive composition, the vinyl boronic acid monomer of formula (I) is 3-acrylamidophenyl boronic acid.

Polyaminoamides may be formed as well known in the art. In certain embodiments of the creping adhesive composition, the polyaminoamide is a condensation polymer of a multifunctional carboxylic acid and a multifunctional amine. In certain embodiments of the creping adhesive composition, the polyaminoamide is formed by reacting a polyamine with a dicarboxylic acid or a derivative thereof. In certain embodiments of the creping adhesive composition, the derivative is an ester, an acid chloride, or an anhydride. In certain embodiments of the creping adhesive composition, the polyaminoamide is formed from condensation polymerization of a polyamine and one or more dicarboxylic acids or derivatives thereof under conditions suitable for forming long-chain polyaminoamides. In certain embodiments of the creping adhesive composition, the dicarboxylic acid or derivative thereof is present in an amount sufficient to react with all or substantially all primary amino groups but insufficient to react to a significant degree with the secondary amino groups of the polyamine. In certain embodiments of the creping adhesive composition, the polyaminoamide comprises dicarboxylic acid and polyalkylene polyamine monomers. In certain embodiments of the creping adhesive composition, the polyaminoamide comprises dicarboxylic acid and polyalkylene polyamine monomers at a ratio of from about 0.5:1 to about 1:0.5. In certain embodiments of the creping adhesive composition, the polyaminoamide comprises dicarboxylic acid and polyalkylene polyamine monomers at a ratio of from about 0.8:1 to about 1:0.8.

In certain embodiments of the creping adhesive composition, the polyamine is selected from diethylenetriamine ("DETA"), triethylenetetraamine ("TETA"), tetraethylenepentamine ("TEPA"), dipropylenetriamine, and the like, or a combination thereof. In certain embodiments of the creping adhesive composition, the polyamine is diethylenetriamine.

In certain embodiments of the creping adhesive composition, the dicarboxylic acid or derivative thereof is selected from adipic acid, maleic acid, succinic acid, glutaric acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl ethyl adipate, dimethyl sebacate, dimethyl phthalate, dimethyl isophthalate, dimethyl terephthalate, dimethyl naphthalenedicarboxylate, dibasic esters ("DBE"), poly(ethylene glycol) bis(carboxymethyl)ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthalic anhydride, or a combination thereof. In certain embodiments of the creping adhesive composition, an ester derivative of a dicarboxylic acid is used. In certain embodiments of the creping adhesive composition, the ester is a $C_1$-$C_4$ aliphatic ester.

In certain embodiments of the creping adhesive composition, the polyamine is diethylenetriamine and the organic dicarboxylate is adipic acid or a derivative thereof.

The polyaminoamide polymer can have any suitable molecular weight. In certain embodiments of the creping adhesive composition, the polyaminoamide has a molecular weight of from about 500 Daltons to about 2,000,000 Daltons. Thus, in certain embodiments of the creping adhesive composition, the polyaminoamide has a molecular weight of from about 500 to about 2,000,000 Daltons, from about 500 to about 1,000,000 Daltons, from about 1,000 to about 1,000,000 Daltons, from about 1,000 to about 400,000 Daltons, from about 1,000 to about 350,000 Daltons, from about 1,000 to about 300,000 Daltons, from about 1,000 to about 250,000 Daltons, from about 1,000 to about 200,000 Daltons, from about 5,000 to about 1,000,000 Daltons, from about 5,000 to about 500,000 Daltons, from about 5,000 to about 250,000 Daltons, from about 10,000 to about 500,000 Daltons, from about 10,000 to about 250,000 Daltons, or from about 1,000 to about 500,000 Daltons.

In certain embodiments of the creping adhesive composition, the polyaminoamide is a crosslinked polyaminoamide. In certain embodiments of the creping adhesive composition, the polyaminoamide polymer is crosslinked with an epihalohydrin. In certain embodiments of the creping adhesive composition, the epihalohydrin is epifluorohydrin, epichlorohydrin, epibromohydrin, epiiodohydrin, or a combination thereof. In certain embodiments of the creping adhesive composition, the polyaminoamide polymer is crosslinked with epichlorohydrin. In certain embodiments of the creping adhesive composition, the polyaminoamide-epihalohydrin polymer is formed prior to functionalization with the vinyl boronic acid.

In certain embodiments of the creping adhesive composition, the polyaminoamide-epihalohydrin polymer is formed by reacting a polyaminoamide with an epihalohydrin. The polyaminoamide-epihalohydrin polymer can have any suitable molecular weight. In certain embodiments of the creping adhesive composition, the polyaminoamide-epihalohydrin has a molecular weight of about 10,000 to about 2,000,000 Daltons. Thus, in certain embodiments of the creping adhesive composition, the polyaminoamide-epihalohydrin has a molecular weight of from about 10,000 to about 2,000,000 Daltons, from about 10,000 to about 1,500,000 Daltons, from about 10,000 to about 1,000,000 Daltons, from about 25,000 to about 2,000,000 Daltons, from about 25,000 to about 1,500,000 Daltons, from about 25,000 to about 1,000,000 Daltons, from about 25,000 to about 500,000 Daltons, from about 50,000 to about 1,000,000 Daltons, from about 50,000 to about 500,000 Daltons, from about 100,000 to about 1,000,000 Daltons, from about 25,000 to about 750,000 Daltons, from about 25,000 to about 400,000 Daltons, or from about 300,000 to about 850,000 Daltons.

In certain embodiments of the creping adhesive composition, the boronic acid-functionalized polymer is synthesized by reacting a vinyl boronic acid with a polyaminoamide ("PAA") or a crosslinked polyaminoamide at elevated temperature (e.g., about 50 C or greater, or from about 50° C. to about 100° C., or from about 50° C. to about 95° C.). In certain embodiments of the creping adhesive composition, a polyaminoamide or a polyaminoamide-epihalohydrin polymer is reacted with a vinyl boronic acid monomer of formula (I) at a temperature of about 50° C. or greater. In certain embodiments of the creping adhesive composition, a vinyl boronic acid functionalized polyaminoamide is synthesized as shown below.

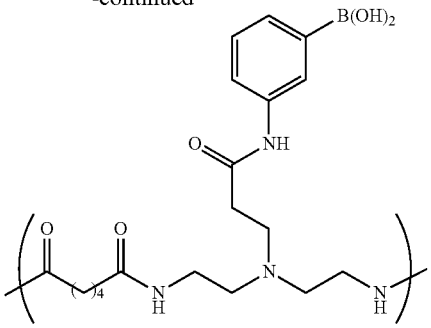

In certain embodiments of the creping adhesive composition, the boronic acid-functionalized polymer is synthesized by reacting a vinyl boronic acid with a crosslinked polyaminoamide at elevated temperature as described herein. In certain embodiments of the creping adhesive composition, a polyaminoamide-epihalohydrin polymer is reacted with a vinyl boronic acid monomer of formula (I) at an elevated temperature as described herein to form a vinyl boronic acid-functionalized crosslinked PAA. In certain embodiments of the creping adhesive composition, the boronic acid-functionalized polymer is synthesized as shown below.

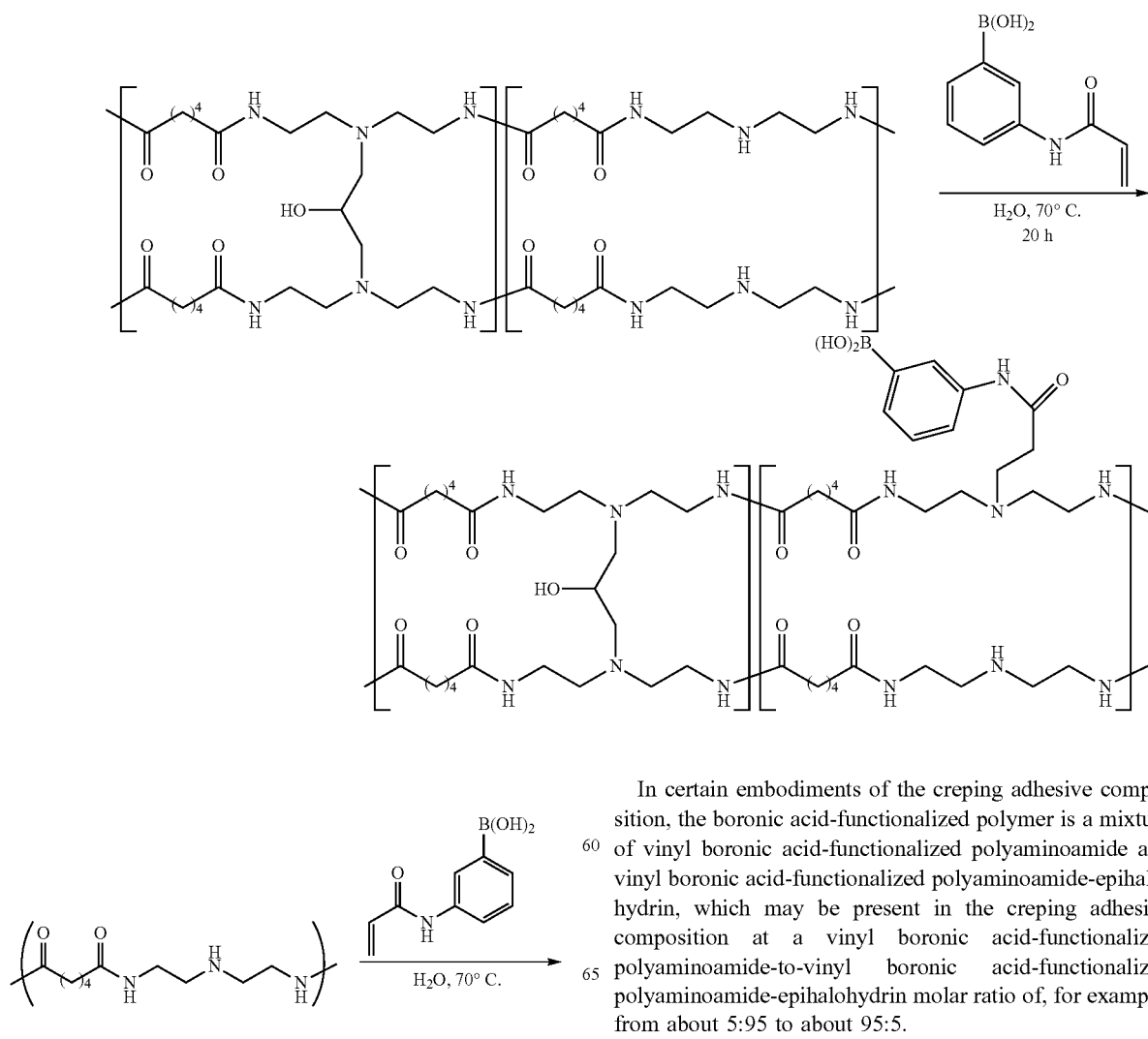

In certain embodiments of the creping adhesive composition, the boronic acid-functionalized polymer is a mixture of vinyl boronic acid-functionalized polyaminoamide and vinyl boronic acid-functionalized polyaminoamide-epihalohydrin, which may be present in the creping adhesive composition at a vinyl boronic acid-functionalized polyaminoamide-to-vinyl boronic acid-functionalized polyaminoamide-epihalohydrin molar ratio of, for example, from about 5:95 to about 95:5.

The boronic acid-functionalized polymer can comprise any suitable amount of vinyl boronic acid monomer. In certain embodiments of the creping adhesive composition, the boronic acid-functionalized polymer comprises from about 0.0001 wt % to about 30 wt % vinyl boronic acid monomer. Thus, in certain embodiments of the creping adhesive composition, the boronic acid-functionalized polymer comprises from about 0.0001 wt % to about 30 wt %, from about 0.001 wt % to about 30 wt %, from about 0.01 wt % to about 30 wt %, from about 0.1 wt % to about 30 wt %, from about 0.5 wt % to about 30 wt %, from about 1 wt % to about 30 wt %, from about 0.0001 wt % to about 25 wt %, from about 0.0001 wt % to about 20 wt %, from about 0.0001 wt % to about 15 wt %, from about 0.0001 wt % to about 10 wt %, from about 0.0001 wt % to about 5 wt %, from about 0.0001 wt % to about 4 wt %, from about 0.0001 wt % to about 3 wt %, from about 0.0001 wt % to about 2 wt %, from about 0.0001 wt % to about 1 wt %, from about 0.0001 wt % to about 0.5 wt %, from about 0.01 wt % to about 15 wt %, from about 0.01 wt % to about 10 wt %, from about 0.01 wt % to about 5 wt %, from about 0.01 wt % to about 4 wt %, from about 0.01 wt % to about 3 wt %, from about 0.01 wt % to about 2 wt %, or from about 0.01 wt % to about 1 wt % vinyl boronic acid monomer. In certain embodiments of the creping adhesive composition, the boronic acid-functionalized polymer comprises from about 0.01 wt % to about 15 wt % vinyl boronic acid monomer. In certain embodiments of the creping adhesive composition, the boronic acid-functionalized polymer comprises from about 0.01 wt % to about 10 wt % vinyl boronic acid monomer.

The boronic acid-functionalized polymers may have any suitable molecular weight. In certain embodiments of the creping adhesive composition, the boronic acid-functionalized polymer has a molecular weight of from about 5,000 Daltons to about 2,000,000 Daltons. Thus, in certain embodiments, the boronic acid-functionalized polymer has a molecular weight of from about 5,000 to about 2,000,000 Daltons, from about 10,000 to about 1,750,000 Daltons, from about 10,000 to about 1,500,000 Daltons, from about 10,000 to about 1,250,000 Daltons, from about 10,000 to about 1,000,000 Daltons, from about 10,000 to about 900,000 Daltons, from about 10,000 to about 750,000 Daltons, from about 10,000 to about 500,000 Daltons, from about 10,000 to about 400,000 Daltons, from about 10,000 to about 300,000 Daltons, from about 10,000 to about 250,000 Daltons, from about 50,000 to about 1,000,000 Daltons, from about 75,000 to about 1,000,000 Daltons, from about 100,000 to about 1,000,000 Daltons, from about 150,000 to about 1,000,000 Daltons, from about 250,000 to about 1,000,000 Daltons, from about 400,000 to about 1,000,000 Daltons, from about 25,000 to about 2,000,000 Daltons, from about 50,000 to about 2,000,000 Daltons, from about 75,000 to about 2,000,000 Daltons, from about 100,000 to about 2,000,000 Daltons, from about 150,000 to about 2,000,000 Daltons, from about 200,000 to about 2,000,000 Daltons, from about 250,000 to about 2,000,000 Daltons, or from about 400,000 to about 2,000,000 Daltons. In certain embodiments of the creping adhesive composition, the boronic acid-functionalized polymer has a molecular weight of from about 250,000 to about 2,000,000 Daltons.

The creping adhesive composition can comprise any suitable amount of boronic acid-functionalized polymer. In certain embodiments, the creping adhesive composition comprises a boronic acid-functionalized polymer in an amount of from about 0.01 wt % to about 50 wt %. Thus, in certain embodiments, the creping adhesive composition comprises a boronic acid-functionalized polymer in an amount of from about 0.01 wt % to about 50 wt %, from about 0.01 wt % to about 45 wt %, from about 0.01 wt % to about 40 wt %, from about 0.01 wt % to about 35 wt %, from about 0.01 wt % to about 30 wt %, from about 0.01 wt % to about 25 wt %, from about 0.1 wt % to about 20 wt %, from about 0.1 wt % to about 15 wt %, or from about 1 wt % to about 15 wt % based on weight of the creping adhesive composition.

In certain embodiments, the creping adhesive composition comprises a polyvinyl alcohol ("PVOH").

In certain embodiments, the creping adhesive comprises a vinyl boronic acid-functionalized polyaminoamide-epihalohydrin and a polyvinyl alcohol. In certain embodiments, the creping adhesive comprises a vinyl boronic acid-functionalized polyaminoamide and a polyvinyl alcohol. In certain embodiments of the creping adhesive composition, the ratio of vinyl boronic acid-functionalized polyaminoamide-epihalohydrin or vinyl boronic acid-functionalized polyaminoamide to polyvinyl alcohol is from about 99:1 to about 1:99 In certain embodiments of the creping adhesive composition, the ratio of vinyl boronic acid-functionalized polyaminoamide-epihalohydrin or vinyl boronic acid-functionalized polyaminoamide to polyvinyl alcohol is from about 10:1 to about 1:10. In certain embodiments of the creping adhesive composition, the ratio of vinyl boronic acid-functionalized polyaminoamide-epihalohydrin or vinyl boronic acid-functionalized polyaminoamide to polyvinyl alcohol is from about 5:1 to about 1:5. In certain embodiments of the creping adhesive composition, the ratio of vinyl boronic acid-functionalized polyaminoamide-epihalohydrin or vinyl boronic acid-functionalized polyaminoamide to polyvinyl alcohol is from about 2:1 to about 1:2.

In certain embodiments, the creping adhesive composition comprises a carboxylic acid modified PVOH, sulfonic acid modified PVOH, amine modified PVOH, ketone modified PVOH, anhydride modified PVOH, an unmodified crosslinked PAA, an unmodified PAA, crosslinked PAA modified with chloropropanediol, crosslinked PAA modified with N[TRIS(hydroxymethyl)methyl]acrylamide), a hydrolyzed N-vinylformamide polymer, a polyethyleneimine, a glyoxalated polyacrylamide or copolymer, a polyvinylpyrrolidone, a starch or modified starch, a carboxymethylcellulose, or a combination thereof.

In certain embodiments, the creping adhesive composition comprises a humectant. In certain embodiments of the creping adhesive composition, the humectant is a low molecular weight water soluble polyol such as polyethylene glycol, propylene glycol, ethylene glycol, diethylene glycol, triethylene glycol, dipropylene glycol, glycerol, polyglycerol, or a combination thereof. In certain embodiments of the creping adhesive composition, the humectant is ethylene glycol, propylene glycol, glycerol, polyglycerol, or a combination thereof.

In certain embodiments, the creping adhesive composition comprises a humectant in an amount of about 1 wt % to about 95 wt % based on weight of the adhesive composition. In certain embodiments, the creping adhesive composition comprises a humectant in an amount of about 10 wt % to about 75 wt % based on weight of the adhesive composition. In certain embodiments, the creping adhesive composition comprises a humectant in an amount of about 25 wt % to about 50 wt % based on weight of the adhesive composition. The creping cylinder may be treated with humectant together with or separately from the creping adhesive composition.

A phosphorus-containing compound may be utilized as part of or in addition to the creping adhesive composition provided herein to improve film properties on the surface of the creping cylinder. In certain embodiments of the creping adhesive composition and methods provided herein, the creping adhesive composition comprises a phosphorus-containing compound. However, the phosphorus-containing compound may be added to the creping cylinder prior to or after the creping cylinder is treated with the creping adhesive composition. In certain embodiments of the creping adhesive composition and methods provided herein, the phosphorus-containing compound is a sodium, potassium, or ammonium salt of orthophosphate, pyrophosphate, metaphosphate, polyphosphate, phosphate, and hypophosphite. In certain embodiments of the creping adhesive composition and methods provided herein, the phosphorus-containing compound is a phosphate salt formed in situ by adjustment of the pH of the creping adhesive composition with phosphoric acid. In certain embodiments of the creping adhesive composition and methods provided herein, the phosphorus-containing compound is monoammonium phosphate, diammonium phosphate, phosphate salt formed in situ by adjusting the pH of the creping adhesive composition with phosphoric acid, or a combination thereof.

The phosphorus-containing compound may be utilized in any suitable amount. In certain embodiments of the creping adhesive composition and methods provided herein, the phosphorus-containing compound is utilized in an amount of from about 0.1 wt % to about 100 wt % based on the weight of creping adhesive composition. In certain embodiments of the creping adhesive composition and methods provided herein, the phosphorus-containing compound is utilized in an amount of about 0.1 wt % to about 20 wt % based on the weight of creping adhesive composition.

In certain embodiments, the creping adhesive composition comprises a plasticizer. In certain embodiments of the creping adhesive composition, the plasticizer is a sugar, e.g., glucose, fructose, sorbitol, or a combination thereof. In certain embodiments of the creping adhesive composition, the plasticizer is sorbitol. In certain embodiments, the creping adhesive composition comprises a plasticizer in an amount of from about 5 wt % to about 40 wt % by weight of the creping adhesive composition. In certain embodiments, the creping adhesive composition comprises a plasticizer in an amount of from about 10 wt % to about 30 wt % by weight of the creping adhesive composition. In certain embodiments, the creping adhesive composition comprises a plasticizer in an amount of from about 15 wt % to about 25 wt % by weight of the creping adhesive composition.

In certain embodiments of the creping adhesive composition and methods provided herein, the creping adhesive comprises a release aid. In certain embodiments of the creping adhesive composition and methods provided herein, the release aid comprises an oil (e.g., a release oil). In certain embodiments of the creping adhesive composition and methods provided herein, the oil comprises naphthenic oil, paraffinic oil, vegetable oil, mineral oil, synthetic oil, or a combination thereof. In certain embodiments of the creping adhesive composition and methods provided herein, the release aid further comprises an emulsifying surfactant. In certain embodiments of the creping adhesive composition and methods provided herein, the emulsifying surfactant is selected from a fatty acid, an alkoxylated alcohol, an alkoxylated fatty acid, or a combination thereof. In certain embodiments of the creping adhesive composition and methods provided herein, the release aid comprises one or more (poly)$C_5$-$C_{20}$ alpha olefins and optionally one or more surfactants. The creping cylinder may be treated with release aid together with or separately from the creping adhesive composition.

A functional additive may be added to the creping adhesive composition or applied separately to the creping cylinder. Nonlimiting examples of functional additives include organic quaternary salts having fatty chains of about 12 to about 22 carbon atoms including dialkyl imidazolinium quaternary salts, dialkyl diamidoamine quaternary salts, monoalkyl trimethylanimonium quaternary salts, dialkyl dimethylanimonium quaternary salts, trialkylmonomethylammonium quaternary salts, ethoxylated quaternary salts, dialkyl and trialkyl ester quaternary salts, and the like. Additional suitable functional additives include polysiloxanes, quaternary silicones, organoreactive polysiloxanes, amino-functional polydimethylsiloxanes, and the like. In certain embodiments of the creping adhesive composition and methods provided herein, the functional additive is a dialkylimidazolinium quaternary salt or quaternary silicone.

A method of treating a creping cylinder is provided. The method comprises applying to the creping cylinder a creping adhesive composition comprising a boronic acid-functionalized polymer.

A creping adhesive composition may be applied to a creping cylinder in any suitable manner conventional in the art. For example, in certain embodiments of the methods provided herein, the creping adhesive composition is applied to a creping cylinder by spraying the creping adhesive composition onto the creping cylinder. The spraying application may comprise, for example, using a sprayboom designed for double or triple coverage, oscillating a sprayboom, and/or recirculating creping adhesive composition from the outlet of the sprayboom to improve mixing and reduce the possibility of separation of the ingredients of the creping adhesive composition. Examples of methods of applying compositions to creping cylinders are described, for example, in U.S. Pat. No. 7,048,826, which is incorporated by reference herein in its entirety. In at least one embodiment, the creping adhesive composition is applied to the creping cylinder via atomization (e.g., gas atomization, air atomization). Other manners of applying the creping adhesive composition to a creping cylinder can be contemplated by one skilled in the art.

A method of creping paper is provided. The method comprises (a) applying a creping cylinder with a creping adhesive composition comprising a boronic acid-functionalized polymer, (b) contacting a fibrous web with the treated creping cylinder; and (c) dislodging the dried fibrous web from the treated creping cylinder.

In certain embodiments, the boronic acid-functionalized polymer is selected from a vinyl boronic acid-functionalized polyaminoamide, a vinyl boronic acid-functionalized crosslinked polyaminoamide polymer, or a combination thereof.

In certain embodiments of the creping adhesive composition, the boronic acid-functionalized polymer comprises a vinyl boronic acid monomer of formula (I)

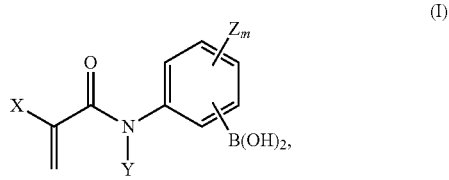

wherein X is hydrogen, $C_1$-$C_{12}$ alkyl, $C_2$-$C_{12}$ alkenyl, $C_2$-$C_{12}$ alkynyl, aryl, heteroaryl, halogen, or halosubstituted alkyl; Y is hydrogen, $C_1$-$C_{12}$ alkyl, $C_2$-$C_{12}$ alkenyl, $C_2$-$C_{12}$ alkynyl, aryl, heteroaryl, halogen, hydroxyl, alkoxy, carboxyl, or sulfonyl; each Z is the same or different, and is hydrogen, $C_1$-$C_{12}$ alkyl, $C_2$-$C_{12}$ alkenyl, $C_2$-$C_{12}$ alkynyl, aryl, heteroaryl, benzyl, alkylheteroaryl, halogen, halosubstituted alkyl, amino, aminoalkyl, cyano, alkoxy, hydroxyl, thiol, alkylthio, carbonyl, nitro, phosphoryl, phosphonyl, or sulfonyl; and m is 1, 2, 3, or 4; or a salt thereof.

The creping adhesive composition and methods provided herein can be used in any suitable paper creping process. For example, the papermaking process may comprise forming a fibrous web, adhering the fibrous web to a treated creping cylinder for a period of time to dry the fibrous web, and removing the fibrous web of the treated creping cylinder using a creping blade (e.g., doctor blade). The dry fibrous web may be wound onto a roll. In certain embodiments, the creping adhesive composition is applied to the surface of the creping cylinder prior to contact of the fibrous web with the creping cylinder.

In certain embodiments of the methods provided herein, the creping cylinder is a Yankee dryer.

In certain embodiments of the methods provided herein, the fibrous web is partially dried by a through-air dryer prior to the Yankee dryer.

In certain embodiments of the methods provided herein, the creping cylinder is treated with a creping adhesive composition in an amount of from about 0.01 milligrams composition per square meter of creping cylinder (i.e., mg/m$^2$) to about 100 mg/m$^2$. In certain embodiments of the methods provided herein, the creping cylinder is treated with a creping adhesive composition in an amount of from about 0.01 mg/m$^2$, or from about 0.1 mg/m$^2$, or from about 1 mg/m$^2$, to about 100 mg/m$^2$, or to about 60 mg/m$^2$, or to about 20 mg/m$^2$. In certain embodiments of the methods provided herein, the creping cylinder is treated with a creping adhesive composition in an amount of from about 1 mg/m$^2$ to about 20 mg/m$^2$.

The creping cylinder may be treated with creping adhesive composition using any suitable method. In certain embodiments of the methods provided herein, the creping adhesive is sprayed onto the surface of the creping cylinder. In certain embodiments of the methods provided herein, the creping adhesive is sprayed onto the surface of the creping cylinder using a spray boom. The amount of boronic acid-functionalized polymer applied to the creping cylinder is not limited. In certain embodiments of the creping adhesive composition and methods provided herein, the creping adhesive composition is an aqueous mixture or aqueous solution. In certain embodiments of the creping adhesive composition and methods provided herein, the aqueous mixture or aqueous solution comprises about 0.1 wt % to about 40 wt % boronic acid-functionalized polymer by weight of the aqueous mixture or aqueous solution. In certain embodiments of the creping adhesive composition and methods provided herein, the aqueous mixture or aqueous solution comprises about 0.1 wt % to about 20 wt % boronic acid-functionalized polymer by weight of the aqueous mixture or aqueous solution.

In certain embodiments, the creping adhesive composition has a pH of from about 6 to about 10. Thus, in certain embodiments, the creping adhesive has a pH of about 6 to about 10, from about 6 to about 9.5, from about 6 to about 9, from about 6 to about 8.5, from about 6 to about 8, from about 6 to 7.5, from about 6.5 to about 10, from about 7 to about 10, from about 7.5 to about 10, from about 8 to about 10, from about 8.5 to about 10, from about 7.5 to about 9.5, from about 8 to about 9.5, from about 7.5 to about 9, from about 8 to about 9, or from about 8 to about 8.5.

The resulting functionalized polymers may be blended with other chemical components to form a creping adhesive composition for use in a papermaking process or a tissue-making process.

The tissue product can be any article which comprises tissue paper. In certain embodiments, the tissue product is bathroom tissue, facial tissue, napkin, medical pad, or a paper towel.

The wood pulp source used to produce the papermaking fibers is not limited. For example, hardwood and softwood pulps and a combination thereof can be used as a source of papermaking fibers for the tissue webs of the present invention. Useful wood pulps include chemical pulps such as sulfite and sulfate pulps (e.g., kraft pulp) as well as mechanical pulps including ground wood, thermomechanical pulp, and chemi-thermomechanical pulp. Papermaking fibers derived from recycled paper can also be used with the present invention. In certain embodiments, the papermaking fibers are virgin chemical wood pulps. The cellulose fibers may be sourced from plant sources other than trees. For example, cellulose fibers may be sourced from agricultural residues, including those from rice, wheat straw, corn stalks, flax straw, and sugar cane (bagasse). Additionally, fiber crops may be utilized as a source of cellulose fibers, including, but not limited to, industrial hemp, kenaf, and bamboo.

The following examples further illustrate the invention but, of course, should not be construed as in any way limiting its scope.

EXAMPLE 1

This Example demonstrates a method of synthesizing a boronic acid-functionalized polymer in accordance with an embodiment of the invention.

An polyaminoamide-epichlorohydrin ("PAE" (an example of a crosslinked PAA), 15%; 475.0 g) was added to a 3-neck, 1000-mL reactor equipped having a RTD probe, oil bath, overhead motor, and stainless steel stirrer with a Teflon blade. The reactor was charged with deionized water (24.28 g) and the solution was stirred at 500 rpm. The solution was warmed to 70° C. 3-Acrylamidophenyl boronic acid ("APBA," 0.72 g) was added directly to the reactor as a solid. The mixture was maintained at 70° C. for six hours. After six hours had elapsed, the solution was cooled to less than 35° C. The pH of the vinyl boronic acid functionalized polyaminoamide-epichlorohydrin was adjusted to 6.0±0.1 using concentrated sulfuric acid. Samples were analyzed using LC-MS to determine the residual APBA. Samples A-K were prepared using the above procedure. Tables I and II show the molecular weight of the starting polyaminoamide-epichlorohydrin and the APBA-functionalized polyamino-amide-epichlorohydrin, as well as the amount of APBA in the APBA-functionalized polyaminoamide-epichlorohydrin samples. The wt % of Table I is the percent mass ratio of APBA to polyaminoamide-epichlorohydrin.

TABLE I

APBA Functionalization of PAE Samples

| Sample | PAE starting MW, kDa | APBA-modified PAE MW, kDa | APBA, wt. % |
|---|---|---|---|
| A | 380 | 370 | 10 |
| B | 800 | 820 | 1 |

TABLE I-continued

APBA Functionalization of PAE Samples

| Sample | PAE starting MW, kDa | APBA-modified PAE MW, kDa | APBA, wt. % |
|---|---|---|---|
| C | 800 | 840 | 5 |
| D | 800 | 780 | 10 |
| E | | | 10 |

TABLE II

APBA Functionalization of PAE Samples

| Sample | PAE starting MW, kDa | APBA, wt. % |
|---|---|---|
| F | 260 | 1 |
| G | 1900 | 1 |
| H | 260 | 10 |
| I | 150 | 15 |
| J | 150 | 5 |
| K | 150 | 10 |

EXAMPLE 2

This Example demonstrates a method of synthesizing a boronic acid-functionalized polymer in accordance with an embodiment of the creping adhesive composition provided herein.

Polyaminoamide ("PAA," 50%, 30.0 g) was added to a 250 mL round bottom flask equipped with a temperature probe and stir bar. The reactor was charged with deionized water (69.85 g) and the mixture was stirred at 600 rpm. 3-Acrylamidophenyl boronic acid ("APBA," 0.15 g) was added directly to the reactor as a solid. The mixture was warmed to 70° C. and stirred for 20 hours. The solution was cooled to less than 35° C. and collected. Samples were analyzed using LC-MS to determine the residual APBA. Samples L-O were prepared using this procedure. Table III shows the amount of APBA and % actives for Samples L-O, as well as the residual amount of APBA monomer present in the functionalized product.

TABLE III

APBA Functionalization of PAA Samples

| Sample | APBA wt. % | Actives, % | Residual APBA monomer, ppm |
|---|---|---|---|
| L | 5 | 15 | 1 |
| M | 1 | 15 | |
| N | 0.5 | 15 | |
| O | 0.1 | 15 | |

EXAMPLE 3

This Example examines the adhesion of a boronic acid-functionalized polymer in accordance with embodiments of the methods provided herein.

The adhesive properties of Sample I under wet conditions were examined. A general peel adhesion test method was used to test peel adhesion in the Examples, unless specified otherwise. The general peel adhesion test method measured the force required to peel a cotton cloth strip from a heated metal plate. First a film of the neat creping adhesive composition was applied to the metal plate by means of a #40 wire-wound coating rod. The metal plate was heated to 100° C. and at this point a wet cotton strip was pressed into the film by means of a 1.9 kg cylindrical roller. After the strip was applied, the metal plate was placed in a 105° C. oven for 15 minutes to dry the film and cotton strip. The metal plate was then clamped in a tensile testing apparatus. One end of the cotton cloth was clamped in the pneumatic grip of the tester and the cloth was peeled from the plate at an angle of 180° and at a constant speed. During the peeling the metal plate was controlled to a temperature of 100° C.

Films of Sample I and the unmodified PAE starting material for Sample I were formed and dried in the normal manner according to the general peel adhesion test method described herein. The pH of the starting materials was adjusted to pH 9.5 prior to use. The films were cooled to 37-41° C., and a wet cotton strip of specified moisture content was immediately pressed into the film. With no further heating of the films, the films were immediately loaded into the tester and peeled at 180° to determine the adhesion force. The results are shown in Table IV.

TABLE IV

Adhesion versus Moisture Content

| Moisture, % | 31 | 39 | 47 | 59 | 68 |
|---|---|---|---|---|---|
| Adhesion, g/in | | | | | |
| Sample I | 65 | 29 | 22 | 9 | 6 |
| Unmodified PAE (Sample I starting material) | 111 | 16 | 4 | 5 | 6 |

Sample I showed higher adhesion than the unmodified starting material over the elevated moisture range of from 39 to 59%.

EXAMPLE 4

This Example examines the adhesion of a boronic acid-functionalized polymer in accordance with an embodiment of the methods provided herein.

Adhesion of Sample A versus the unmodified PAE starting material was examined using a peel adhesion test. The testing conditions were in accordance with the general peel adhesion test method described herein. The pH of the samples was 7.8. The results are shown in Table V and are an average of two tests each.

TABLE V

Peel Adhesion of APBA-Functionalized PAE versus Unmodified Starting Material

| Sample | Peel Adhesion, g/in |
|---|---|
| A | 551 |
| Unmodified PAE (sample A starting material) | 389 |

As shown in Table V, an improvement of 42% in the peel adhesion was observed believed to be due to the incorporation of 10 weight percent APBA.

EXAMPLE 5

This Example examines the adhesion of a boronic acid-functionalized polymer as a function of pH of the polymer in accordance with an embodiment of the methods provided herein.

Adhesion of a number of APBA-functionalized PAEs versus the unmodified PAE starting material as a function of pH was examined using the general peel adhesion test method described herein. The results are shown in Table VI.

TABLE VI

Peel adhesion results for Samples B, C, and D as a function of pH.

| Sample | APBA wt % | Adhesion, g/in at pH 5.5-6.0 | at pH 8.0-8.5 |
|---|---|---|---|
| B | 1 | | 491 |
| C | 5 | | 416 |
| D | 10 | 246 | 586 |
| Unmodified PAE | 0 | 423 | |

As shown in Table VI, adhesion improves as the weight percent of APBA incorporation is increased from 1% to 5% to 10% in Samples B to C to D, respectively. Adjusting the sample to a pH of approximately at least 8 increases adhesion for the APBA functionalized samples. For Sample D, an increase of 39% in adhesion was observed compared to the control (PAE without APBA) at a pH of approximately 6.

EXAMPLE 6

This Example examines the adhesion of a boronic acid-functionalized polymer as a function of pH of the polymer in accordance with an embodiment of the invention.

The adhesion of Sample E (functionalized with 10 wt. % APBA) versus the unmodified starting material as a function of pH was examined using a peel adhesion test. The testing conditions were in accordance with the general peel adhesion test method described herein. The results are shown in Table VII.

TABLE VII

Peel Adhesion Results for Sample E as a Function of pH.

| Sample | Adhesion, g/in pH 5.5-6.0 | pH 8.0-8.5 |
|---|---|---|
| E | 419 | 846 |
| PAE without APBA | 442 | |

As shown in Table VII, there was an improvement of approximately 91% in adhesion at a pH of approximately 8 versus the PAE without APBA at a pH of approximately 6.

EXAMPLE 7

This Example examines the adhesion of a PAE without a boronic acid monomer as a function of pH of the polymer in accordance with an embodiment of the invention.

The adhesion of a PAE having no boronic acid monomer was determined as a function of pH. The results are shown in Table VIII.

TABLE VIII

Peel Adhesion of Non-Functionalized PAE as a Function of pH

| pH | Adhesion, g/in |
|---|---|
| 5.8 | 455 |
| 6.9 | 395 |

TABLE VIII-continued

Peel Adhesion of Non-Functionalized PAE as a Function of pH

| pH | Adhesion, g/in |
|---|---|
| 8.0 | 176 |
| 8.5 | 130 |

As shown in Table VIII, the adhesion decreases with an increase in pH. This result is opposite to the behavior observed with the APBA-functionalized PAEs in Tables VI and VII.

EXAMPLE 8

This Example examines the adhesion, film durability, and viscosity of a boronic acid-functionalized polymer as a function of pH in accordance with an embodiment of the invention.

The adhesion, film durability and viscosity of Sample H were evaluated as a function of pH. Adhesion and film durability were evaluated according to the general peel adhesion test method described herein. The Brookfield viscosity was measured using a DV-II+ viscometer, spindle number 18, using speeds of 12-60 rpm at a temperature of 25° C. Durability is ranked on a scale of 1-5 with higher values indicating a more durable film by judging the ease of removing the dried film from the metal plate. The dried film was removed from the metal plate by running a stream of water onto the surface of the film. The results are shown in Table IX.

TABLE IX

Sample H Adhesion, Film Durability, and Viscosity as a Function of pH.

| Sample | pH | BFV, cps | Adhesion, g/in | Durability |
|---|---|---|---|---|
| H | 9.2 | 111 | 243 | 3 |
| H | 8.2 | 109 | 214 | 3 |
| H | 7.8 | 77 | 285 | 3 |
| H | 7.1 | 51 | 292 | 3 |
| H | 6.5 | 42 | 244 | 2 |
| H | 5.7 | 37 | 206 | 2 |
| Unmodified starting material | 8.5 | 28 | 155 | 2 |

As shown in Table IX, Sample H showed improved viscosity, adhesion, and durability as pH increased.

EXAMPLE 9

This Example examines the solubility of a boronic acid-functionalized polymer in accordance with an embodiment of the invention.

The film solubility of Sample E was evaluated as a function of pH. The test was conducted in accordance with the film solubility test method described herein and was used to determine film solubility in the remaining Examples, unless specified otherwise. The Film Solubility Test Method evaluates polymer film durability based on the film solubility when exposed to hot aqueous conditions. One milliliter of the composition to be evaluated was applied to a 1 inch by 2 inch strip of a WYPALL brand paper towel (available from Kimberly-Clark Worldwide, Inc.) The treated strip was then placed in a 105° C. oven for one hour or until a constant dry weight was achieved. The dried strip was transferred to an 8 ounce glass jar with lid containing 150 mL of tap water at 50° C. The jars were placed in an incubating orbital shaker (VWR catalog number 12620-946) at 150 rpm for one hour. After one hour, the strips were removed from the jars and dried again in a 105° C. oven for one hour or until a constant weight is achieved. The film solubility is calculated from the difference in the mass of the strip before and after soaking. The results are shown in Table X.

TABLE X

Film solubility of Sample E as a function of pH.

| pH | % Dissolved |
|---|---|
| 6 | 63.4 |
| 8 | 58.7 |

As shown in Table X, Sample E film became less soluble when the pH was raised from 6 to 8.

EXAMPLE 10

This Example examines the effect of a boronic acid-functionalized polymer on solubility of a crosslinking PAE film in accordance with an embodiment of the invention.

A crosslinking PAE of moderate molecular weight was combined with both APBA-functionalized PAA and an unfunctionalized PAA. Films of the samples were prepared and analyzed for solubility.

TABLE XI

Film Solubility as a Function of PAA Content and Modification.

| Sample | pH | % Dissolved |
|---|---|---|
| Crosslinking PAE | 7 | 34.9 |
| 70/30 Blend of crosslinking PAE/unmodified Sample L | 8.5 | 53.1 |
| 70/30 Blend of crosslinking PAE/Sample L | 8.5 | 50.8 |

As shown in Table XI, the crosslinking PAE forms a relatively insoluble film (34.9% soluble). Addition of the unmodified Sample L (Sample L without boronic acid monomer) to the film increases solubility to 53.1%. When the PAA had 5 weight percent APBA (Sample L), the film solubility decreased to 50.8%. This shows the ability of the APBA modified PAA to increase film durability.

EXAMPLE 11

This Example examines the impact of a boronic acid-functionalized polymer on solubility of a non-crosslinking PAE film in accordance with an embodiment of the invention.

A non-crosslinking PAE was combined with APBA-functionalized PAA, and the films of the respective blends were analyzed for solubility as a function of pH.

TABLE XII

Film Solubility as a Function of Blended APBA-Functionalized PAA and pH.

| Sample | pH | % Dissolved |
|---|---|---|
| Noncrosslinked PAE | 6.5 | 60.1 |
| 70/30 Blend of noncrosslinked PAE/Sample L | 6.0 | 79.5 |
| 70/30 Blend of noncrosslinked PAE/Sample L | 8.5 | 75.4 |

As shown in Table XII, the noncrosslinked PAE formed a relatively soluble film (60.1% soluble). Addition of the APBA-modified PAA Sample L increased film solubility, presumably due to its low molecular weight. However when the pH was raised from 6 to 8.5, solubility decreased. This result shows the ability of the boronic acid-functionalized PAA to increase durability under certain pH conditions.

EXAMPLE 12

This Example examines the adhesion of a boronic acid-functionalized polymer in accordance with an embodiment of the invention.

The adhesion of the APBA-modified PAE in combination with PVOH as a function of APBA weight percent was examined using the peel adhesion test. The testing conditions were in accordance with the general peel adhesion test method described herein. The results are shown in Table XIII. The peel adhesion is expressed as the ratio of the average peel force to the average peel force of a reference 50/50 PVOH/Unmodified PAE blend (272 g/in) multiplied by 100. The polyvinyl alcohol used was Sekisui 523 and was obtained from Sekisui Specialty Chemicals. All solutions were 10 wt. % total solids and the polymer mass ratios were selected such that the APBA to vinyl alcohol polymer mole ratio is maintained at about 5 to 1.

TABLE XIII

Peel Adhesion as a Function of APBA Incorporation.

| Sample | APBA, wt. % | Peel Adhesion, % (relative to 50/50 Sekisui 523/Unmodified PAE) |
|---|---|---|
| 83.3/16.7 Sekisui 523/Sample J | 5 | 423 |
| 90.9/9.1 Sekisui 523/Sample K | 10 | 835 |
| 93.8/6.2 Sekisui 523/Sample I | 15 | 432 |

As shown in Table XIII, all adhesions were at least 4 times greater than the reference 50/50 PVOH/PAE blend and a peak in adhesion force was observed when the APBA incorporation was 10 weight percent.

EXAMPLE 13

This Example examines the adhesion of a boronic acid-functionalized polymer in accordance with an embodiment of the invention.

Adhesion of the APBA-modified PAE in combination with PVOH as a function of APBA weight percent and pH was shown with the peel adhesion test. The testing conditions were in accordance with the general peel adhesion test method described herein. No direct pH measurements were conducted on the samples labeled 'High' and 'Intermediate' pH blends due to their very 'sticky' nature. The pH of the starting APBA modified PAE and PVOH solutions before blending were approximately 8.5 and 7.1, respectively. The polyvinyl alcohols used were Sekisui 523 and Sekisui 425 and were obtained from Sekisui Specialty Chemicals. Peel adhesion is expressed as the ratio of the average peel force to the average peel force of a reference 50/50 PVOH/ Unmodified PAE blend (272 and 253 g/in when the PVOH is Sekisui 523 or Sekisui 425, respectively) multiplied by 100. After testing each condition, the solution pH was lowered using concentrated sulfuric acid.

TABLE XIV

Peel Adhesion as a Function of APBA
wt % Incorporation and Solution pH.

| Sample | pH | Peel Adhesion, % (relative to 50/50 PVOH/Unmodified PAE) |
|---|---|---|
| 83.3/16.7 Sekisui 523/Sample J | 4.77 | 360 |
| | Intermediate | 423 |
| | High | 592 |
| 90.9/9.1 Sekisui 523/Sample K | 2.16 | 354 |
| | Intermediate | 835 |
| | High | 128 |
| 93.8/6.2 Sekisui 523/Sample I | 5.00 | 90 |
| | Intermediate | 432 |
| | High | 216 |
| 94.5/5.5 Sekisui 425/Sample I | 2.16 | 234 |
| | Intermediate | 451 |
| | High | 337 |

As shown in Table XIV, the adhesion force for most blends were above the reference. A peak in adhesion force occurred when the APBA incorporation was 10 weight percent and, except for the 83.3/16.7 Sekisui 523/Sample J blend, the adhesion peak occurred at the intermediate pH. It was also observed that the more viscous Sekisui 425 (relative to the 523) allowed a reduction in the PAE content while maintaining adhesion at least twice that of the reference.

EXAMPLE 14

This Example examines the solubility of a boronic acid-functionalized polymer/PVOH composition in accordance with an embodiment of the invention.

The film solubility of APBA-modified PAE in combination with PVOH was measured. The results are shown in Table XV.

TABLE XV

Film Solubility as a Function of Blend Composition and APBA Incorporation.

| Film composition | Film solubility, % |
|---|---|
| 100% Unmodified PAE | 58.0 |
| 100% Sekisui 523 | 99.1 |
| 50/50 Sekisui 523/Unmodified PAE | 78.5 |
| 50/50 Sekisui 523/1 wt. % APBA-functionalized PAE | 58.1 |

As shown in Table XV, 58.0% and 99.1% of an unmodified PAE film and Sekisui 523 film dissolved, respectively. The solubility of a 50/50 Sekisui/Unmodified PAE blend (78.5%) is approximately the mid-point of the solubility of the separate films. The incorporation of 1 weight percent APBA into the PAE succeeds in stabilizing the film with a 58.1% solubility.

EXAMPLE 15

This Example examines the film thickness of a boronic acid polymer/PVOH composition in accordance with an embodiment of the invention.

The film thickness of APBA-functionalized PAE in combination with PVOH was examined. Films 50% PVOH and either 50% unmodified PAE or 50% APBA-functionalized PAE were created using testing conditions in accordance with the general peel adhesion test method described herein. Just before pressing the wet cotton cloth, film thickness was measured at 10 spots separated by about 2 cm in the middle of the steel plate using a Deltascope FMP30 (Fischer Technology, Inc.). The results are shown in Table XVI.

TABLE XVI

Film Thickness for Films Containing 50% PVOH and either 50% Unmodified PAE or 50% APBA-Functionalized PAE.

| Film composition | Film Thickness, μm (±1 standard deviation) |
|---|---|
| 50/50 Sekisui 523/Unmodified PAE | 2.0 (0.5) |
| 50/50 Sekisui 523/1 wt. % APBA-functionalized PAE | 7.5 (3.4) |

As shown in Table XVI, incorporation of 1 weight percent APBA into the PAE resulted in a film that was 3.75 times thicker than a similar film cast with a PAE having no boronic acid monomer (functionalization).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of treating a creping cylinder, the method comprising:
applying to the creping cylinder a creping adhesive composition comprising a boronic acid-functionalized polymer, wherein the boronic acid-functionalized polymer comprises a unit derived from a vinyl boronic acid monomer of formula (I)

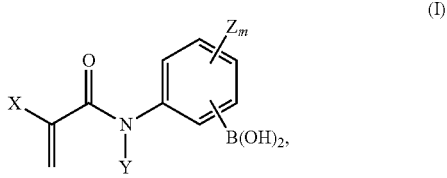

wherein:
X is hydrogen, $C_1$-$C_{12}$ alkyl, $C_2$-$C_{12}$ alkenyl, $C_2$-$C_{12}$ alkynyl, aryl, heteroaryl, halogen, or halosubstituted alkyl;
Y is hydrogen, $C_1$-$C_{12}$ alkyl, $C_2$-$C_{12}$ alkenyl, $C_2$-$C_{12}$ alkynyl, aryl, heteroaryl, halogen, hydroxyl, alkoxy, carboxyl, or sulfonyl;
each Z is the same or different, and is hydrogen, $C_1$-$C_{12}$ alkyl, $C_2$-$C_{12}$ alkenyl, $C_2$-$C_{12}$ alkynyl, aryl, heteroaryl, benzyl, alkylheteroaryl, halogen, halosubstituted alkyl, amino, aminoalkyl, cyano, alkoxy, hydroxyl, thiol, alkylthio, carbonyl, nitro, phosphoryl, phosphonyl, or sulfonyl; and
m is 1, 2, 3, or 4;
or a salt thereof.

2. The method of claim 1, wherein the vinyl boronic acid monomer is 3-acrylamidophenyl boronic acid.

3. The method of claim 1, wherein the creping adhesive composition has a pH of from about 6 to about 10.

4. The method of claim 1, wherein the boronic acid-functionalized polymer is selected from a vinyl boronic acid-functionalized polyaminoamide, a vinyl boronic acid-functionalized crosslinked polyaminoamide polymer, or a combination thereof.

5. The method of claim 4, wherein the vinyl boronic acid-functionalized crosslinked polyaminoamide polymer is formed from a polyaminoamide crosslinked with an epihalohydrin.

6. The method of claim 5, wherein the polyaminoamide is a condensation polymer of a multifunctional carboxylic acid, a multifunctional amine, or a combination thereof.

7. The method of claim 6, wherein the polyaminoamide is formed from diethylene triamine and adipic acid monomers.

8. The method of claim 4, wherein the polyaminoamide is a condensation polymer of a multifunctional carboxylic acid, a multifunctional amine, or a combination thereof.

9. The method of claim 8, wherein the polyaminoamide is formed from diethylene triamine and adipic acid monomers.

10. The method of claim 1, wherein the boronic acid-functionalized polymer has a molecular weight of from about 1,000 Daltons to about 2,000,000 Daltons.

11. The method of claim 1, wherein the creping cylinder is a Yankee dryer.

12. The method of claim 1, wherein the vinyl boronic acid monomer is present in the boronic acid-functionalized polymer in an amount of from about 0.01% to about 15% by weight based on the weight of the boronic acid-functionalized polymer.

13. The method of claim 1, wherein the boronic acid-functionalized polymer has been synthesized by reacting a polyaminoamide or a polyaminoamide-epihalohydrin polymer with the vinyl boronic acid monomer.

14. The method of claim 13, wherein the polyaminoamide is a condensation polymer of a multifunctional carboxylic acid, a multifunctional amine, or a combination thereof.

15. The method of claim 14, wherein the polyaminoamide is formed from diethylene triamine and adipic acid monomers.

16. The method of claim 1, wherein the boronic acid-functionalized polymer is a vinyl boronic acid-functionalized polyaminoamide-epihalohydrin polymer.

17. The method of claim 1, wherein the creping adhesive composition further comprises a polyvinyl alcohol.

18. The method of claim 1, wherein the creping adhesive composition is an aqueous mixture or an aqueous solution.

19. The method of claim 1, wherein the creping cylinder is treated with from about 0.01 to about 100 mg of creping adhesive composition per square meter of creping cylinder.

20. The method of claim 1, wherein the boronic acid-functionalized polymer is present in the creping adhesive composition in an amount of from about 0.0001% to about 30% by weight based on the weight of the creping adhesive composition.

* * * * *